United States Patent
Kuningas et al.

(10) Patent No.: US 8,170,569 B2
(45) Date of Patent: May 1, 2012

(54) METHOD FOR FACILITATE EFFICIENT MULTIMEDIA BROADCAST/MULTICAST SERVICE IN A TELECOMMUNICATION SYSTEM

(75) Inventors: Tarmo Kuningas, Solna (SE); Sharokh Amirijoo, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 370 days.

(21) Appl. No.: 12/594,298

(22) PCT Filed: Mar. 28, 2008

(86) PCT No.: PCT/SE2008/050354
§ 371 (c)(1),
(2), (4) Date: Oct. 1, 2009

(87) PCT Pub. No.: WO2008/123824
PCT Pub. Date: Oct. 16, 2008

(65) Prior Publication Data
US 2010/0120444 A1 May 13, 2010

(30) Foreign Application Priority Data
Apr. 5, 2007 (SE) .................... 0700851

(51) Int. Cl.
*H04W 72/00* (2009.01)
*H04W 40/00* (2009.01)
*H04B 1/38* (2006.01)

(52) U.S. Cl. .............. 455/450; 455/446; 455/464

(58) Field of Classification Search .......... 455/450, 455/446, 464
See application file for complete search history.

(56) References Cited

U.S. PATENT DOCUMENTS
2005/0165945 A1* 7/2005 Lee et al. .................. 709/232
2009/0305712 A1* 12/2009 Franceschini et al. ...... 455/450

OTHER PUBLICATIONS
Translation of Chinese office action, Jul. 26, 2011, in corresponding Chinese Application No. 200880011089.4.

\* cited by examiner

*Primary Examiner* — Christopher M Brandt
*Assistant Examiner* — Scott Au
(74) *Attorney, Agent, or Firm* — Nixon & Vanderhye P.C.

(57) ABSTRACT

A radio access network facilitates transmission of a Multimedia Broadcast/Multicast Service (MBMS) to user equipments in plural cells served by a radio base station. A radio network controller includes in a first message of a transport channel setup request either an indication that transport sharing is allowed or an identification of a common transport bearer. The radio base station configures a new transport channel mapped to the common transport bearer such that it is stable with respect to other common transport channels. During operation, the radio network controller provides the MBMS data over the common transport bearer and the radio base station retransmits the MBMS data over the common transport channels to the plural cells. If the MBMS data over the common transport bearer arrives outside of time-of-arrival windows of any common transport bearer, then the radio network controller adjusts the transmission accordingly.

26 Claims, 10 Drawing Sheets

METHOD FOR FACILITATE EFFICIENT MULTIMEDIA BROADCAST/MULTICAST SERVICE IN A TELECOMMUNICATION SYSTEM

This application is the U.S. national phase of International Application No. PCT/SE2008/050354 filed 28 Mar. 2008, which designated the U.S. and claims priority to SE Application No. 0700851-9 filed Apr. 5, 2007, the entire contents of each of which are hereby incorporated by reference.

RELATED APPLICATION

The technology described herein is related to U.S. patent application Ser. No. 11/555,336 entitled "METHOD AND APPARATUS FOR SHARING TRANSPORT CHANNEL FOR NODE SERVING PLURAL CELLS WITH MULTIMEDIA BROADCAST/MULTICAST" filed on Nov. 1, 2006, the entirety of which is incorporated by reference thereof. The described technology is also related to and claims the benefit of a Swedish Application No. 0700851-9 entitled "METHOD AND ARRANGEMENT IN A TELECOMMUNICATION SYSTEM" filed on Apr. 5, 2007, the entire contents of which are incorporated by reference thereof.

TECHNICAL FIELD

The technology pertains to telecommunications, and in particular to methods and arrangements for handling of frame timing in case of MBMS efficient Iub transport.

BACKGROUND

Multimedia broadcast/multicast service (MBMS) is a point-to-multipoint service in which data is transmitted from a single source entity to multiple recipients. Transmitting the same data to multiple recipients allows network resources to be shared.

FIG. 1 illustrates a conventional telecommunications system 100 to facilitate MBMS. The telecommunications system 100 includes a radio access network (RAN) 130. A Broadcast/Multicast Service Center (BM-SC) 110 contains necessary information to control the MBMS in the RAN 130. The BM-SC 110 is connected through a core network (CN) 120 to the RAN 130. The CN 120 can include a Gateway GPRS Support Node (GGSN) and, in some implementations, a Serving GSN (SGSN) node connected between the GGSN and the RAN 130. Alternatively, in the case of a "one tunnel" implementation, the user plane might not go via SGSN but the control plane always does.

The RAN 130, an example being a Universal Mobile Telecommunications (UMTS) Terrestrial Radio Access Network (UTRAN), includes a radio network controller (RNC) 140 and at least one radio base station 150, also known as a "Node-B" or "B Node". The Node-B 150 can serve one or more cells such as cells C1 through C3 illustrated in FIG. 1. That is, the Node-B 150 provides MBMS data to one or more user equipments (UEs) 160, also known as mobile stations or mobile terminals, which communicate with the Node-B 150 over a radio (or air) interface in the respective cells.

The MBMS utilizes several types of data transport bearers. A MBMS Iu data bearer is a data bearer established to transport the MBMS data from the CN 120 (such as a SGSN node or GGSN) to the RNC 140. A MBMS radio bearer is a data bearer established to transport the MBMS data from the RNC 140 and the UEs 160 via the Node-B 150. The term MBMS RAB refers both to the MBMS Iu data bearer and the MBMS radio bearer.

A MBMS session uses several channels, including: MCCH (MBMS point-to-multipoint Control Channel); MICH (MBMS Notification Indicator Channel); MSCH (MBMS point-to-multipoint Scheduling Channel); and MTCH (MBMS point-to-multipoint Traffic Channel). FIG. 1 shows the MTCHs 155-1, 155-2 and 155-3 (collectively MTCHs 155) between the Node-B 150 corresponding to cells C1, C2 and C3, respectively, served by the Node-B 150. The Node-B 150 delivers the MBMS data to the UEs 160 in the cells using the MTCHs 155 corresponding to each of the cells.

FIG. 1 also shows Iub bearers 145-1, 145-2 and 145-3 (collectively Iub bearers 145), over an Iub interface, i.e., over an interface between the RNC 140 and the Node-B 150. In FIG. 1, the MTCHs 155-1, 155-2 and 155-3 respectively correspond to the Iub bearers 145-1, 145-2 and 145-3. That is, the MBMS data transported over the Iub bearer 145-1 to the Node-B 150 is retransmitted to the UE 160-1 over the MTCH 155-1 corresponding to cell C1 by the Node-B 150. In a similar manner, the MBMS data is transmitted over the Iub bearers 145-2 and 145-3 and retransmitted over the MTCHs 155-2 and 155-3. A forward access channel (FACH) transport channel mechanism is used over the radio interface for each of the Iub bearers 145.

A MBMS session is started with a MBMS Session Start Request message sent from the CN 120 to the RNC 140. The MBMS Session Start Request message includes such information as a MBMS Service ID, a MBMS Bearer Service Type and MBMS Session Attributes. The MBMS Session Start Request message triggers the RNC 140 to notify the UEs 160-1, 160-2, 160-3 and 160-4 (collectively UEs 160) regarding the MBMS Session Start. The MBMS Session Start Request message contains the information necessary to setup (i.e., "configure") the MBMS RAB.

In UTRAN, upon receiving the MBMS Session Start Request message, the RNC 140 performs numerous activities, including execution of a Node-B Application Part (NBAP) protocol. The NBAP protocol provides, among other functions, a Common Transport Channel Management function. This function gives the CRNC (e.g., the RNC 140 in the illustrated scenario) the possibility to manage the configuration of the common transport channels in the Node-B 150. Elementary procedures controlled by the Common Transport Channel Management function include a Common Transport Channel Setup Procedure; a Common Transport Channel Reconfiguration Procedure, and a Common Transport Channel Deletion Procedure.

The Common Transport Channel Setup Procedure is described, e.g., 3GPP TS 25.433 V7.1.0 §8.2.1. The Common Transport Channel Setup Procedure is used for establishing the necessary resources in Node-B, regarding Secondary CCPCH, PICH, PRACH, AICH [FDD], FACH, PCH, RACH and FPACH [1.28 Mcps TDD]. Messages in the Common Transport Channel Setup Procedure include: COMMON TRANSPORT CHANNEL SETUP REQUEST message; COMMON TRANSPORT CHANNEL SETUP RESPONSE message; and COMMON TRANSPORT CHANNEL SETUP FAILURE message. The Common Transport Channel Setup Procedure is initiated with the COMMON TRANSPORT CHANNEL SETUP REQUEST message sent from the RNC 140 to the Node-B 150.

The COMMON TRANSPORT CHANNEL SETUP REQUEST message is described, e.g., in §9.1.3 of 3GPP TS 25.433 V7.1.0 (2006-06). If the COMMON TRANSPORT CHANNEL SETUP REQUEST message contains a FACH Parameters IE, the Node-B 150 configures and activates the indicated FACH(s) according to the COMMON TRANSPORT CHANNEL SETUP REQUEST message. If the COMMON TRANSPORT CHANNEL SETUP REQUEST message includes the Transport Layer Address and Binding ID IEs, the Node-B 150 may use the transport layer address and the binding identifier received from the RNC 140 when establishing a transport bearer for the indicated common transport channels.

After successfully configuring the requested common transport channels and the common physical channels, the Node-B 150 stores the value of Configuration Generation ID IE and responds with the COMMON TRANSPORT CHANNEL SETUP RESPONSE message with the Common Transport Channel ID IE, the Binding ID IE and the Transport Layer Address IE for the configured common transport channels.

In the conventional telecommunications system such as the one illustrated in FIG. 1, a separate Common Transport Channel Setup Procedure is required to establish the MTCH 155-1, 155-2 and 155-3, respectively, for each cell C1, C2 and C3. If the MTCHs 155 are to be established in the three cells C1, C2 and C3 served by the same Node-B 150, then three separate Common Transport Channel Setup Request messages are initiated by the RNC 140, one message for each cell.

FIG. 1 shows that there are three transport bearers 145-1, 145-2 and 145-3 (collectively transport bearers 145), one for each cell, between the RNC 140 and the Node-B 150. These transport bearers 145, also referred to as the MBMS Iub bearers, respectively correspond to the three MTCHs 155. 3GPP TS 25.402 describes the frame timing calculation principles in cases where cell specific transport bearers are used for broadcast/multicast channels.

In the conventional system, a separate transport bearer to transmit the MBMS data from the RNC 140 to the Node-B 150 is configured for each MTCH 155 used to transmit the same MBMS data from the Node-B 150 to the UEs 160 in the respective cells C1, C2 and C3. Allocating separate transport bearers, one for each cell, creates inefficiencies since the same MBMS data are replicated over multiple transport bearers. What is needed is one or more methods, techniques, and/or apparatus for efficiently providing MBMS user data transport to a Node-B which serves plural cells.

SUMMARY

To transmit Multimedia Broadcast/Multicast Service (MBMS) data efficiently from the radio network controller to the radio base station and ultimately to the UEs, it is preferred to use as few transport bearers as possible. The most preferred situation is to use a single transport bearer for a MBMS session for each base station. This contrasts with the conventional system where multiple transport bearers, one bearer corresponding to each of plural cells served by the base station, are used. The single transport bearer is referred to as the "common transport bearer" and the multiple transport channels used for retransmission to the UEs in the plural cells sharing the common transport bearer are referred to as the "common transport channels."

It can be said that the plural common transport channels are mapped to the single common transport bearer. That is, the MBMS data transmitted from the radio network controller over the common transport bearer to the radio base station is retransmitted from the radio base station over each of the mapped common transport channel(s) to the corresponding cells.

Before the MBMS data can be retransmitted to a cell by the radio base station, a transport channel should be configured for the cell. The transport channel is referred to as the "new" transport channel to differentiate it between existing common transport channels (for other cells) that are already mapped to the common transport bearer. Preferably, the new transport channel will also be mapped to the common transport bearer —the new transport channel will become one of the common transport channels after the configuration process completes.

In a non-limiting example method, the new transport channel for a radio access network can be configured as follows. The radio network controller can transmit a transport channel setup request message to the radio base station that is arranged to serve plural cells. The transport channel setup request message corresponds to a particular cell of the plural cells served by the base station. If the radio access network is a Universal Mobile Telecommunications (UMTS) Terrestrial Radio Access Network (UTRAN), then the transport channel setup request message may be a COMMON TRANSPORT CHANNEL SETUP REQUEST MESSAGE and the new transport channel to be configured may be a MBMS point-to-multipoint Traffic Channels (MTCH) of the UTRAN.

The method can include determining the common transport bearer corresponding to the MBMS session. The common transport bearer can be determined either by the radio network controller or the radio base station. If the common transport bearer is determined by the radio access network, then the radio access network can include an identification of the common transport bearer in the transport channel setup request message. The radio access network can determine the identification of the common transport bearer prior to transmitting the transport channel setup request message.

On the other hand, the radio access network may simply include an indication in the transport channel setup request message that transport bearer sharing for the MBMS session is allowed. In this instance, the radio base station can determine the common transport bearer corresponding to the MBMS session after receiving the transport channel setup request message.

The method can include determining the common transport channel(s) that are already mapped to the common transport bearer. Each of the common transport channel(s) correspond to each of the plural cells served by the radio base station other than the particular cell related to the transport channel setup request message. One of the reasons for determining the already existing common transport channel(s) is that the new transport channel should be mapped to the common transport bearer in a way that the new transport channel is stable relative to each of the already existing common transport channel(s). Stability between two transport (first and second) channels using a same transport bearer is achieved when a timing adjustment of the same transport bearer triggered for the first transport channel does not trigger an opposing timing adjustment of the same transport bearer for the second transport channel.

In one example, a time-of-arrival window can be configured for the new transport channel relative to each existing common transport channel such that conditions $abs(T\_Proc(new) - T\_Proc(common)) \leq T\_Proc$ threshold; $abs(TOAWS(new) - TOAWS(common)) \leq TOAWS$ threshold; and $abs(TOAWE(new) - TOAWE(common)) \leq TOAWE$ threshold are satisfied. The connection frame number for the new transport channel may also be set so as to achieve stability relative to the existing common transport channel(s).

The method can include the radio base station transmitting a transport channel setup response message to the radio network controller. The transport channel set up response message includes information related to the to the new transport channel. In UTRAN, the transport channel response message may be a COMMON TRANSPORT SETUP RESPONSE MESSAGE.

The mode can include the radio network controller configuring the time-of-arrival window parameters of the new transport channel in response to the transport channel setup response message. In one example, the radio network controller can set the time-of-arrival window parameters of the new transport channel to be substantially the same as the common transport channel that established the common transport bearer. This guarantees that a timing adjustment to the new transport channel will not cause an opposing timing adjustment to the existing common transport channel, i.e., the transport channels will be stable.

In another example, the radio network controller can modify the time-of-arrival window parameters for all existing common transport channels that use the common transport bearer and set the time-of-arrival window parameters for the new transport channel in consideration of the existing common transport channels. Of course, a combination of the above examples can be used to configure the time-of-arrival window parameters of the new transport channel. The process to modify the existing common transport channels can be initiated by the radio network controller sending a transport channel reconfiguration request message to the radio base station.

The parameters of the common transport channels may be modified during operation to provide the MBMS data to the UEs. During operation, the method may include transmitting the MBMS data over the common transport bearer from the radio network controller to the radio base station. The radio base station can determine whether the MBMS data transmitted over the common transport bearer arrives outside of the time-of-arrival window for any of the common transport channels. If so, the radio base station can transmit a timing adjustment control frame to the radio network controller.

In an example, in response to the timing adjustment control frame from the radio base station, the radio network controller can adjust its transmission timing so that the transmissions will be received within the time-of-arrival windows of the common transport channels. In another example, the radio network controller may signal the radio base station to adjust the time-of-arrival window parameters for one or more common transport channels. This can be done via the transport channel reconfiguration request message. In yet another example, the radio network controller may signal the radio base station to delete one or more common transport channels currently mapped to the common transport bearer. This can be done via a transport channel deletion request message sent to the radio base station. Of course, combination of the examples may be performed in response to the timing adjustment control frame.

In one or more non-limiting example embodiments, a radio access network includes a radio network controller and a radio base station both working cooperatively to deliver MBMS data received from a Broadcast/Multicast Service Center (BM-SC) to the UEs. The radio network controller receives the MBMS data of a MBMS session from the BM-SC via a core network and transmits the MBMS data to the radio base station over a transport bearer. The radio base station retransmits the MBMS data to the user equipments (UEs) in plural cells served by the radio base station over plural transport channels, one for each cell.

The radio network controller can be arranged to transmit a transport channel setup request message for the MBMS session to the radio base station and arranged to transmit the MBMS data of the MBMS session over a common transport bearer corresponding to the MBMS session to the radio base station. The transport channel setup request message can correspond to a particular cell of the plural cells.

The radio base station can be arranged to determine common transport channel(s) where each common transport channel is mapped to a common transport bearer. Each common transport channel corresponds to a cell of the plural cells other than the particular cell related to the transport channel setup request message. The radio base station can be arranged to configure a new transport channel mapped to the common transport bearer such that the new transport channel is stable relative to each of the common transport channel(s). The radio base station can be further arranged to retransmit the MBMS data received over the common transport bearer to each of the mapped common transport channels, for example, during operation.

The radio network controller and/or the radio base station can be arranged to determine the common transport bearer corresponding to the MBMS session. If the radio access network determines the common transport bearer, then the radio access network can include the identification of the common transport bearer in the transport channel setup request message. If the radio base station is to determine the common transport bearer, then the radio access network can include an indication in the transport channel setup request message that transport bearer sharing for the MBMS session is allowed.

The radio base station can be arranged to determine the existing common transport channel(s) that are already mapped to the common transport bearer. Each of the common transport channel(s) corresponds to each of the cells served by the radio base station other than the particular cell related to the transport channel set up request message. Based on the common transport channel(s), the radio base station can configure the new transport channel to be stable relative to the existing common transport channel(s). The radio base station can transmit a transport channel setup response message to the radio network controller. The transport channel setup response message can includes information related to the new transport channel. The radio network controller, in response to the transport channel setup response message, can be arranged configure the time-of-arrival window parameters of the new transport channel.

The parameters of the common transport channels may be modified during operation to provide the MBMS data to the UEs. During operation, the radio network controller can transmit the MBMS data over the common transport bearer to the radio base station. The radio base station can determine whether the MBMS data arrives outside of the time-of-arrival window for any of the common transport channels. If so, the radio base station can transmit a timing adjustment control frame to the radio network controller.

The radio network controller can perform one or both of: adjusting its transmission timing; signaling the radio base station to adjust the time-of-arrival window parameters for one or more common transport channels; and signaling the radio base station to delete one or more common transport channels currently mapped to the common transport bearer.

In one or more embodiments, the radio base station can be arranged to receive a transport channel setup request message for a MBMS session transmitted from a radio network controller; determine common transport channel(s), where each common transport channel is mapped to a common transport bearer that corresponds to the MBMS session; configure a new transport channel also mapped to the common transport bearer such that the new transport channel is stable relative to each of the common transport channel(s). The transport channel setup request message is assumed to correspond to a particular cell of the plural cells served by the radio base station and the common transport channel(s) are assumed to correspond to cells of the plural cells other than the particular cell.

The radio base station can be arranged such that if the transport channel setup request message includes an indication that transport bearer sharing for the MBMS session is allowed, the radio base station determines the common transport bearer that corresponds to the MBMS session.

During operation, the radio base station can determine whether the MBMS data arrives outside of the time-of-arrival window for any of the common transport channels. If so, the radio base station can transmit a timing adjustment control frame to the radio network controller. If the radio base station receives a signal from the radio network controller to adjust the time-of-arrival window parameters for one or more common transport channels, it can do so. If it receives a signal to delete one or more common transport channels currently mapped to the common transport bearer, it can do that as well.

One of many advantages of the example embodiments and modes is the following. Instead of replicating multiple transport bearers from the radio network controller to the radio base station, the number of transport bearers is reduced to the provide the same amount of MBMS data, which in turn results in enhanced utilization of the network's resources.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 2:
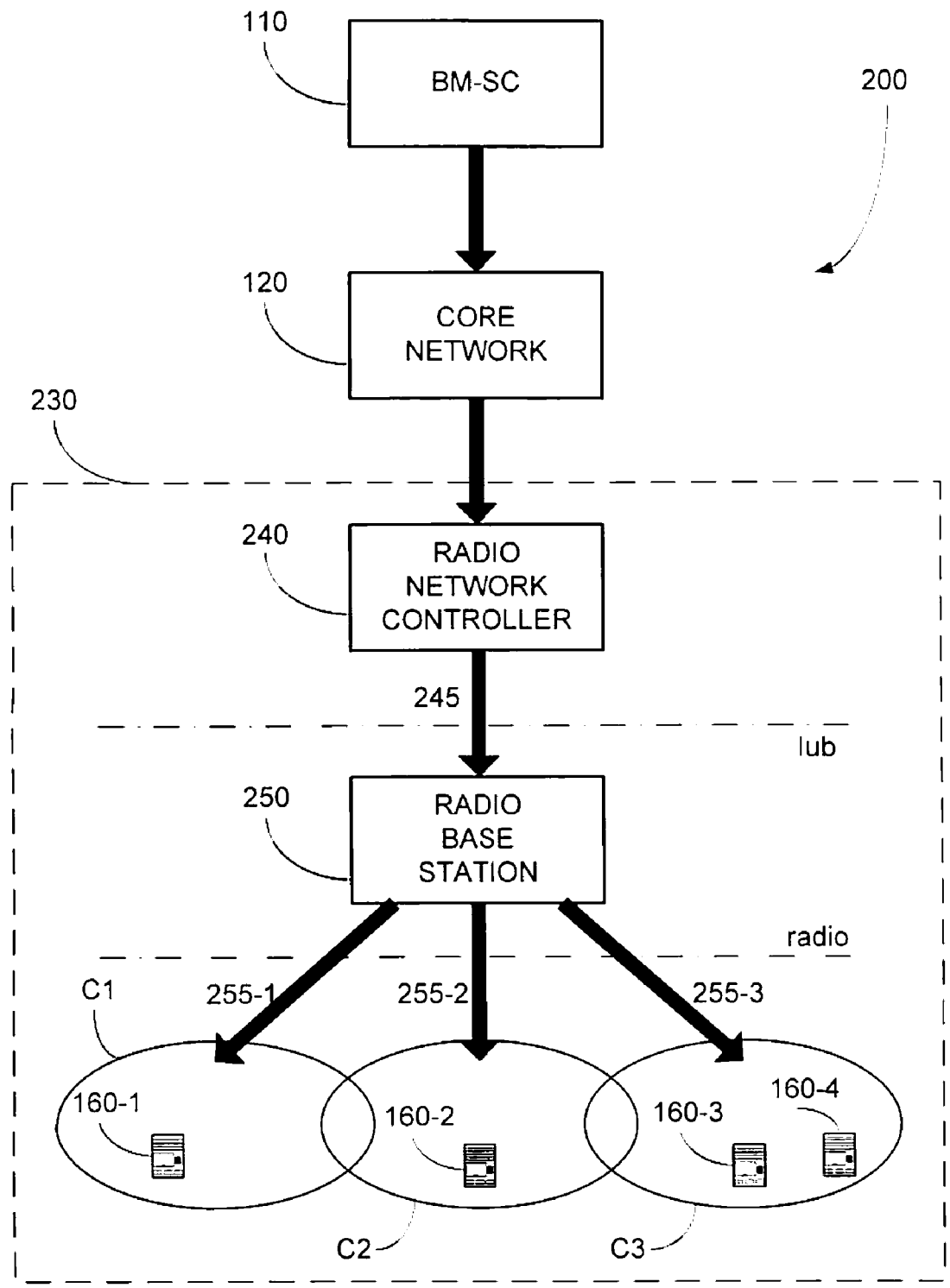
FIG. 2 illustrates a diagrammatic view of the telecommunications system of an example telecommunications system to facilitate the MBMS.

The present invention is described in the non-limiting, example context of a telecommunications system 200 illustrated in FIG. 2. The telecommunications system 200 includes a radio access network (RAN) 230 which, in a non-limiting illustrated example embodiment, can be a Universal Mobile Telecommunications (UMTS) Terrestrial Radio Access Network (UTRAN). The radio access network 230 includes node(s) that are capable of receiving transmissions from a Broadcast/Multicast Service Center (BM-SC) 110.

The telecommunications system 200 further includes one or more core network nodes 120 (such as a SGSN and/or GGSN, not shown). The core network node 120 is situated and arranged to receive transmissions from the BM-SC 110. In this regard, the BM-SC 110 can itself situated in the core network 120 or situated externally to the core network 120 as shown in FIG. 2.

The radio access network 230 includes one or more radio network controllers (RNCs) 240. Each radio network controller 240 is connected over an interface (such as the Iu interface when the radio access network 230 is a UTRAN) to appropriate core network node(s). Each radio network controller node 240 is also connected (in UTRAN, over an interface Iub) to one or more radio base stations (RBS) 250 and likely to one or more other radio network controllers 240 in radio access network 230. Those skilled in the art will also appreciate that a radio base station can be a Node-B, or B-node, all such terms being used interchangeably herein.

For sake of simplicity, the radio access network 230 of FIG. 2 is illustrated with only one radio network controller 240 and one radio base station 250. The radio base station 250 communicates with user equipments (UEs) 160, also referred to as mobile station or mobile terminals, over a radio or air interface. In the example embodiment of FIG. 2, radio base station 250 serves plural cells, three such cells $C_1$, $C_2$, and $C_3$ being illustrated for sake of example. The service of plural cells by a single radio base station 250 is facilitated by the radio base station 250 having different, e.g., different transceivers for the respective, different cells.

Figure 3:
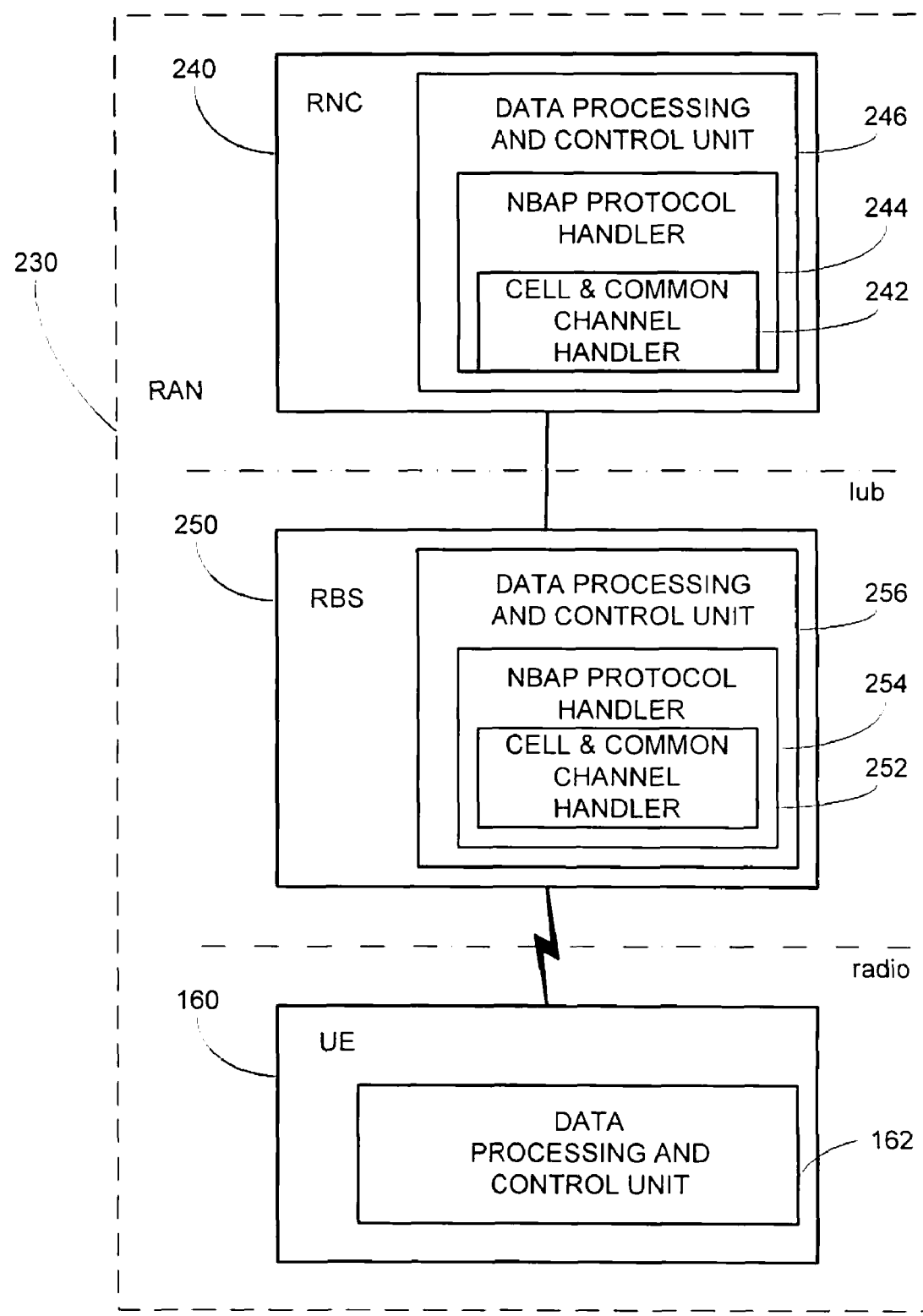
FIG. 3 illustrates example components of a radio access network.

By way of example, FIG. 3 shows representative user equipments 160 situated in each cell. That is, referring back to FIG. 2, user equipment 160-1 is currently served by cell C1, user equipment 160-2 is currently served by cell C2, and user equipments 160-3 and 160-4 are currently served by cell C3. It will be appreciated that typically many user equipment are in each cell, and that a transmission of data for a Multimedia Broadcast/Multicast Service (MBMS) session can be provided essentially simultaneously to each of the plural user equipment which have requested participation in the particular MBMS session. That is, all the user equipment in a cell simultaneously listen to the transport channel, i.e., MTCH, in the cell which carries the MBMS session.

In addition to selected general aspects of the user equipment 160, illustrative nodes such as the radio network controller 240 and the radio base station 250 are also shown in FIG. 3. The user equipment unit 160 shown in FIG. 3 includes a data processing and control unit 162 arranged to control various operations required by the user equipment 160. The data processing and control unit 34 provides control signals as well as data to a radio transceiver connected to an antenna (not illustrated).

The example radio network controller 240 and the base station 250 as shown in FIG. 3 are radio access network 230 nodes that each include a corresponding data processing and control unit 246 and 256, respectively, for performing numerous radio and data processing operations required to conduct communications between the radio network controller 240 and the user equipments 160 via the radio base station 250. Part of the equipment controlled by the radio base station data processing and control unit 256 includes plural radio transceivers connected to one or more antennas (not shown). To facilitate the use of the Multimedia Broadcast/Multicast Service (MBMS), the radio network controller node 240 includes a cell & common channel handler 242. Likewise, the radio base station 250 includes a cell & common channel handler 252.

The cell & common channel handler 242 of the radio network controller 240 can be realized by a Common Transport Channel Management function which is included in a Node-B Application Protocal (NBAP). For this reason, in the example implementation of FIG. 3, the cell & common channel handler 242 is shown as being included in a NBAP Protocol handler 244 for the radio network controller 240. In similar fashion, the cell & common channel handler 252 is shown as being included in a NBAP Protocol handler 254 for the radio base station 250. In the illustrated example implementation, one or both of the NBAP Protocol handler 244 and 254 (and thus the cell & common channel handlers 242 and 252 encompassed thereby) can comprise the respective data processing and control units 246 and 256, which can be (for example) a controller or processor in the sense of those terms having been previously broadly defined.

Referring back to FIG. 2, it is preferred that as few transport bearers 245 are used to deliver the MBMS data from the radio network controller 240 to the radio base station 250. In a most preferred situation, a single transport bearer 245, referred to as the common transport bearer 245, is mapped to each of the common transport channels 255-1, 255-2 and 255-3 (collectively referred to as the common transport channels 255). That is, the MBMS data of the MBMS session transmitted from the radio network controller 240 over the common transport bearer 245 to the radio base station 250 is retransmitted from the radio base station 250 over the mapped common transport channels 255 to the corresponding cells C1-C3.

Figure 1:
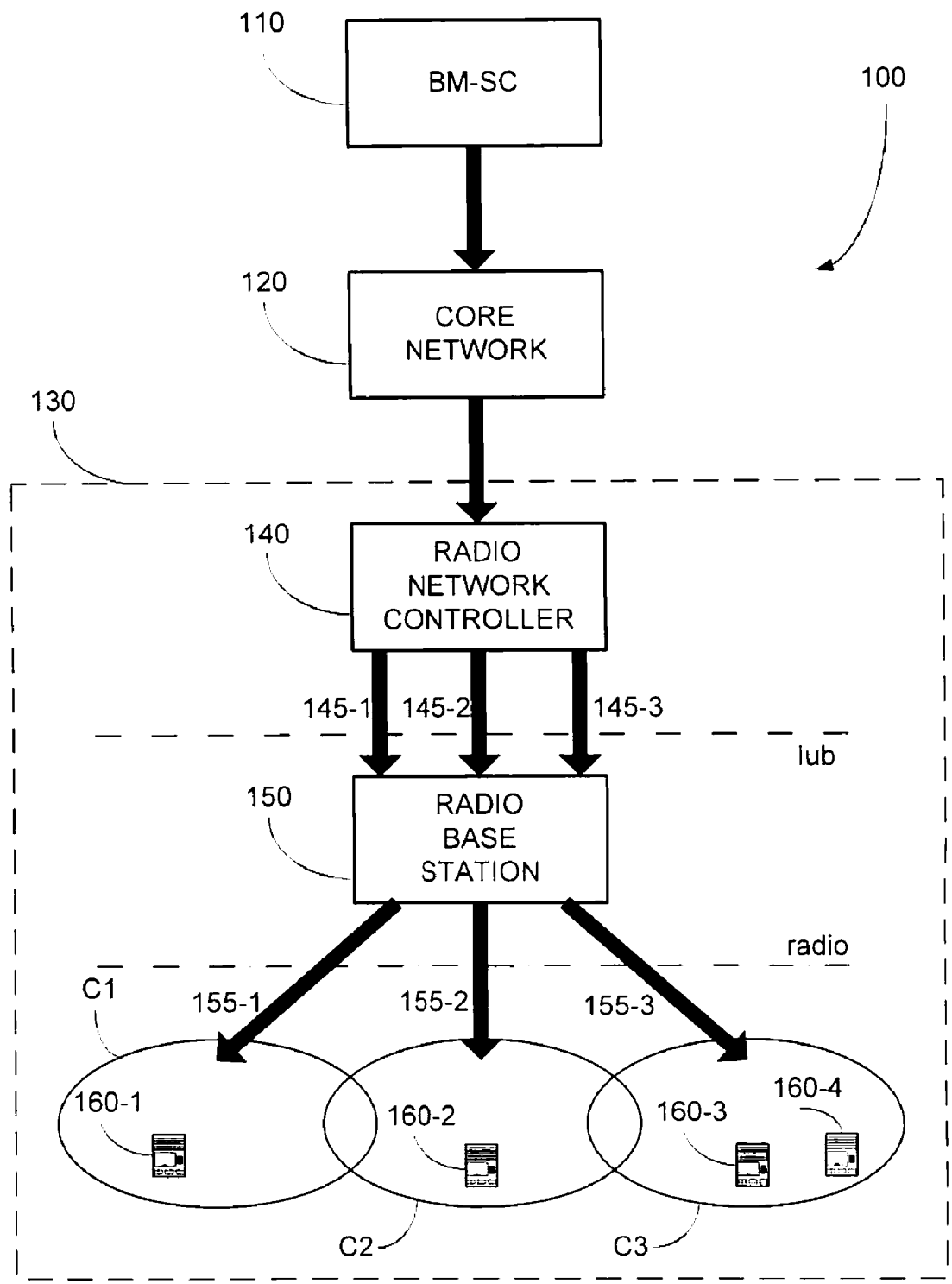
FIG. 1 illustrates a diagrammatic view of a conventional telecommunications system which facilitates a Multimedia Broadcast/Multicast Service (MBMS)

In contrast to the conventional system 100 illustrated in FIG. 1, network resource utilization is enhanced since the number of transport bearers carrying the same MBMS data is reduced. An example of a transport channel 255 is a MBMS point-to-multipoint Traffic Channel (MTCH) of a Universal Mobile Telecommunications (UMTS) Terrestrial Radio Access Network (UTRAN). While only three cells are illustrated, this is only for explanation purposes. Any number of cells is contemplated.

Figure 4A:
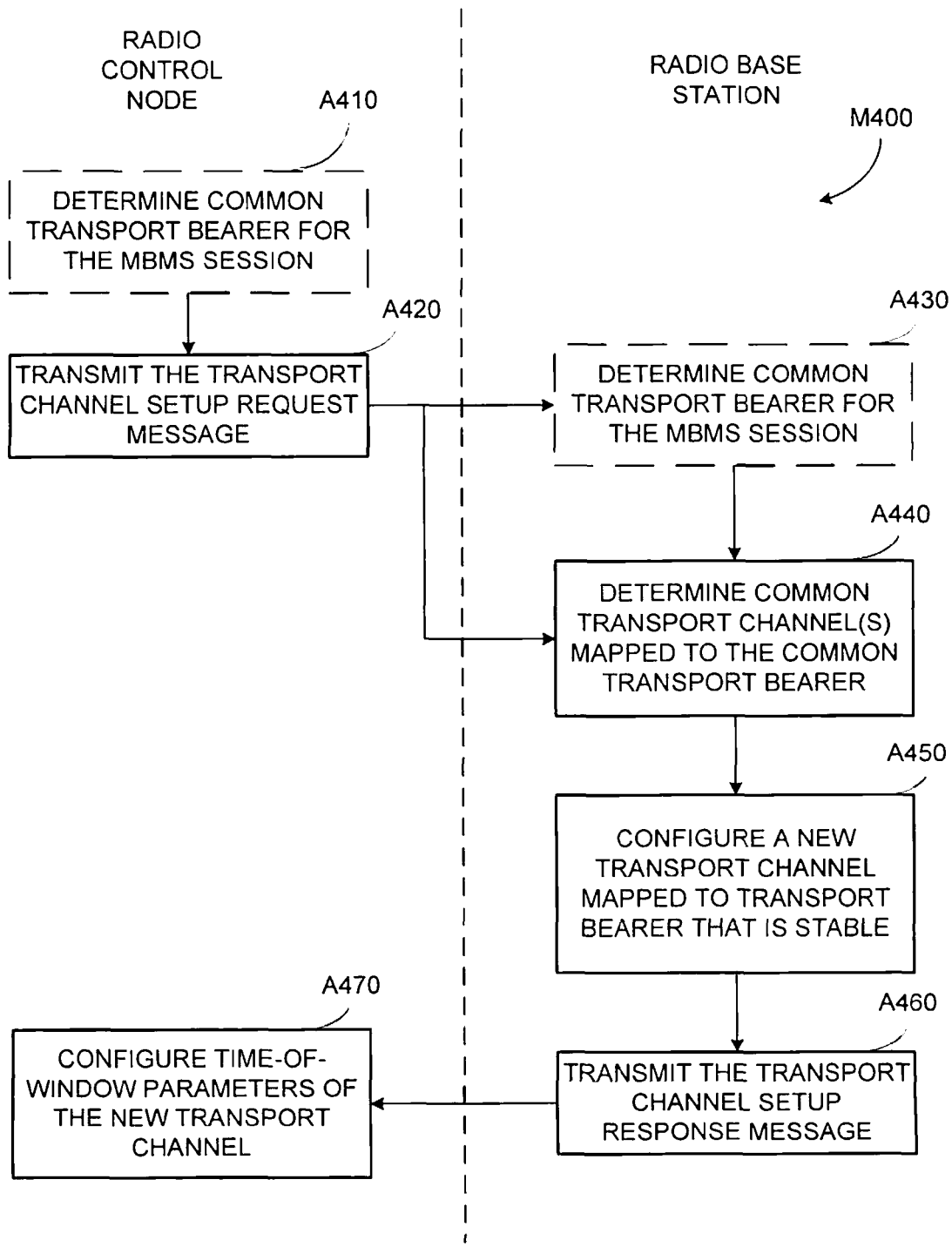
FIGS. 4A and 4B illustrate example modes of operation to facilitate MBMS.

FIG. 4A illustrates example, generic, representative acts performed in conjunction with a method of operating a radio access network (such as radio access network 230) to facilitate transmission of a Multimedia Broadcast/Multicast Service to plural user equipments served by a radio base station such as radio base station 250. The acts of the method M400 of FIG. 4A can be performed after a MBMS Session Start Request, and include execution of a Common Transport Channel Setup procedure as described herein. Acts of FIG. 4A performed by the radio network controller node 240 can be performed, e.g., by the cell & common channel handler 242, and similarly acts of FIG. 4A performed by the radio base station 250 can be performed, e.g., by the cell & common channel handler 252.

Figure 4B:
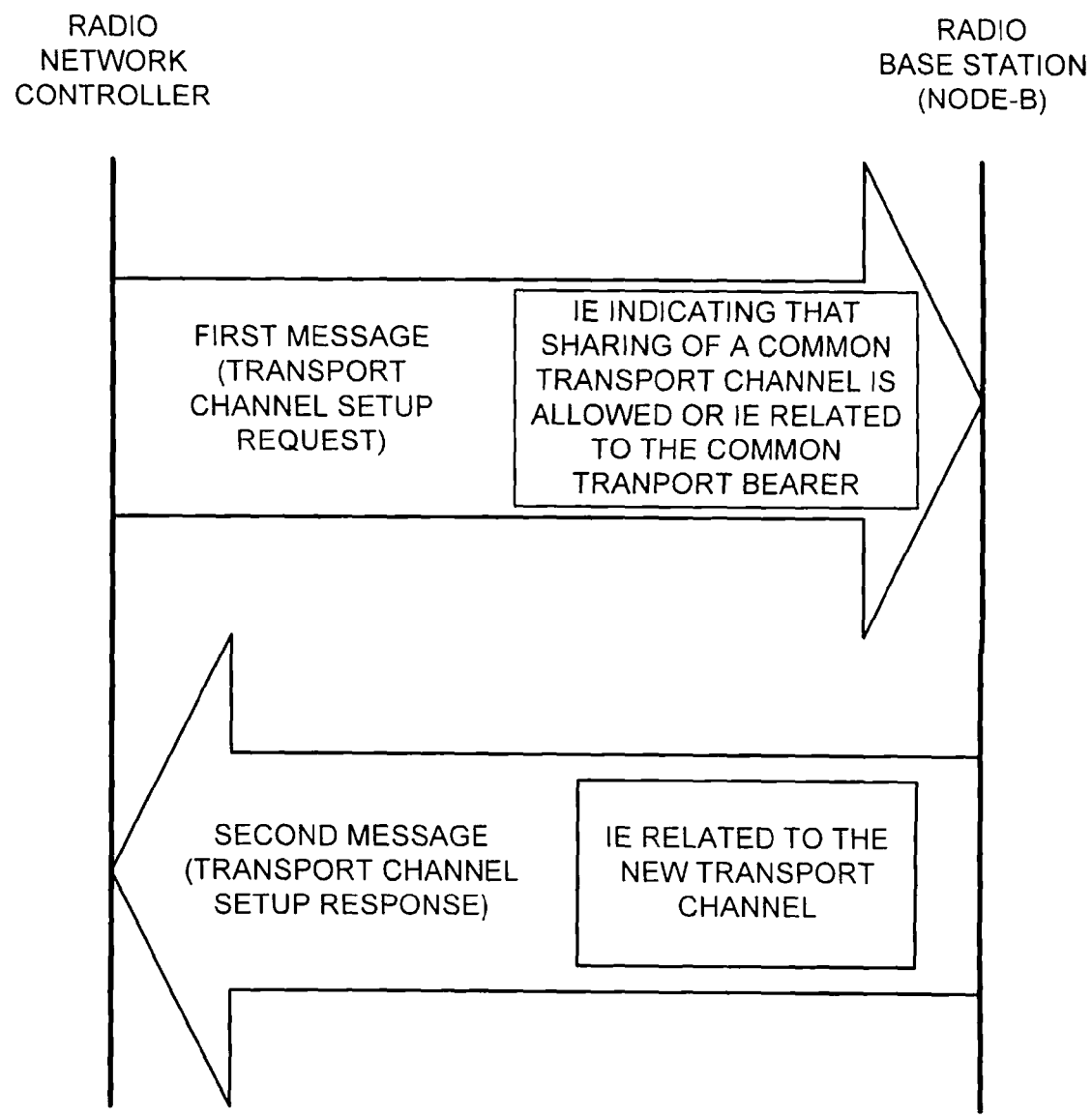

Whereas FIG. 4A depicts example acts of the example method, FIG. 4B shows transmission of example messages involved in the method. In one aspect, a separate Common Transport Channel Setup procedure is performed to establish the common transport channel, e.g., MTCH, in different cells. In other words, if the transport channels are to be established in three cells C1-C3 served by the same radio base station 250, then three separate transport channel setup request messages are initiated by the radio network controller 240, one such message for each cell. The example acts of FIG. 4A are therefore discussed in the context of performance of one Common Transport Channel Setup procedure without specifying whether that one Common Transport Channel Setup procedure is a first such Common Transport Channel Setup procedure performed for the radio base station 250, or whether one or more such procedures involving the radio base station 250 have already been performed.

As illustrated in FIG. 4A, the radio network controller 240 initiates the Common Transport Channel Setup procedure for the MBMS session by a transmitting a transport channel setup request message for to the radio base station 250 arranged to serve the plural cells C1-C3 in act A420. In UTRAN, the transport channel setup request message can be a COMMON TRANSPORT CHANNEL SETUP REQUEST MESSAGE. As illustrated in FIG. 4B, the transport channel setup request message is an example of a first message transmitted from the radio network controller 240 to the radio base station 250.

If the common transport bearer 245 corresponding to the MBMS session is already established, for example, through running a previous Common Transport Channel Setup procedure, the radio network controller 240 can determine the common transport bearer 245 in act A410 and include an identification of the common transport bearer 245 in the transport channel setup request message in act A420 (see FIG. 4B).

On the other hand, if the radio network controller 240 simply indicates that transport bearer sharing is allowed for the MBMS session in the transport channel setup request message in act A420 (also see FIG. 4B), then the radio base station 250 can determine the common transport bearer 245 in act A430.

In act A440, the radio base station 250 determines the common transport channel(s) 255 that are currently mapped to the common transport bearer 245. When a new transport channel 255 is mapped to the transport bearer 245, then the MBMS data transmitted from the radio network controller 240 over the common transport bearer 245 to the radio base station 250 is retransmitted over the new transport channel 255 to a cell corresponding to the transport channel 255. In this instance, it can be assumed that the common transport channel(s) 255 correspond to the plural cells other than the particular cell related to the transport channel setup request message.

In act A450, the radio base station 250 configures the new transport channel 255 for the particular cell such that the new transport channel 255 is mapped to the common transport bearer 245. In UTRAN, the new transport channel 255 can be a MTCH. The configuration is such that the new transport channel 255 is stable relative to each of the already existing common transport channels 255, which can also be MTCHs.

Figure 8A:
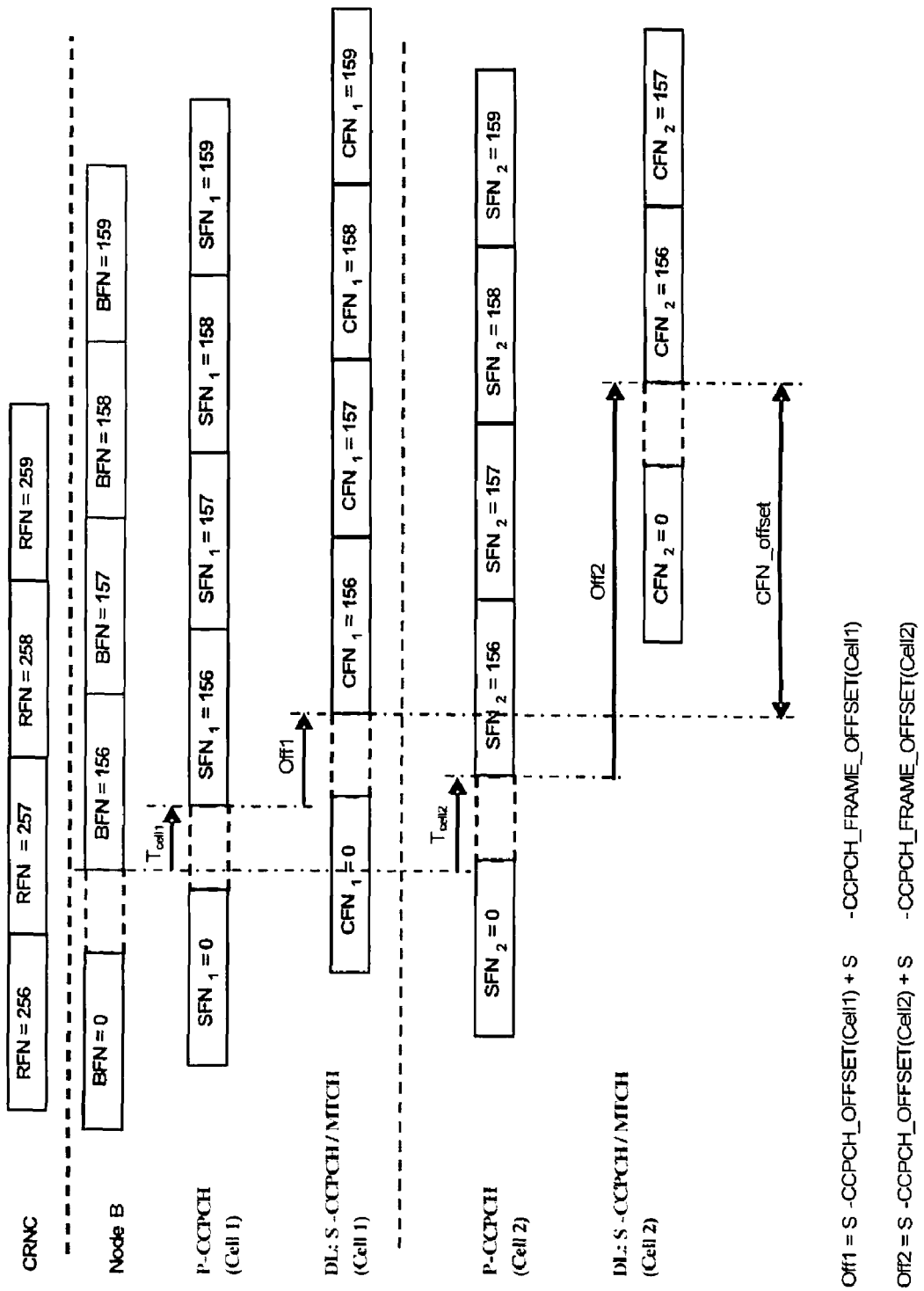
FIG. 8A illustrates an example timing offset calculation.
Figure 8B:
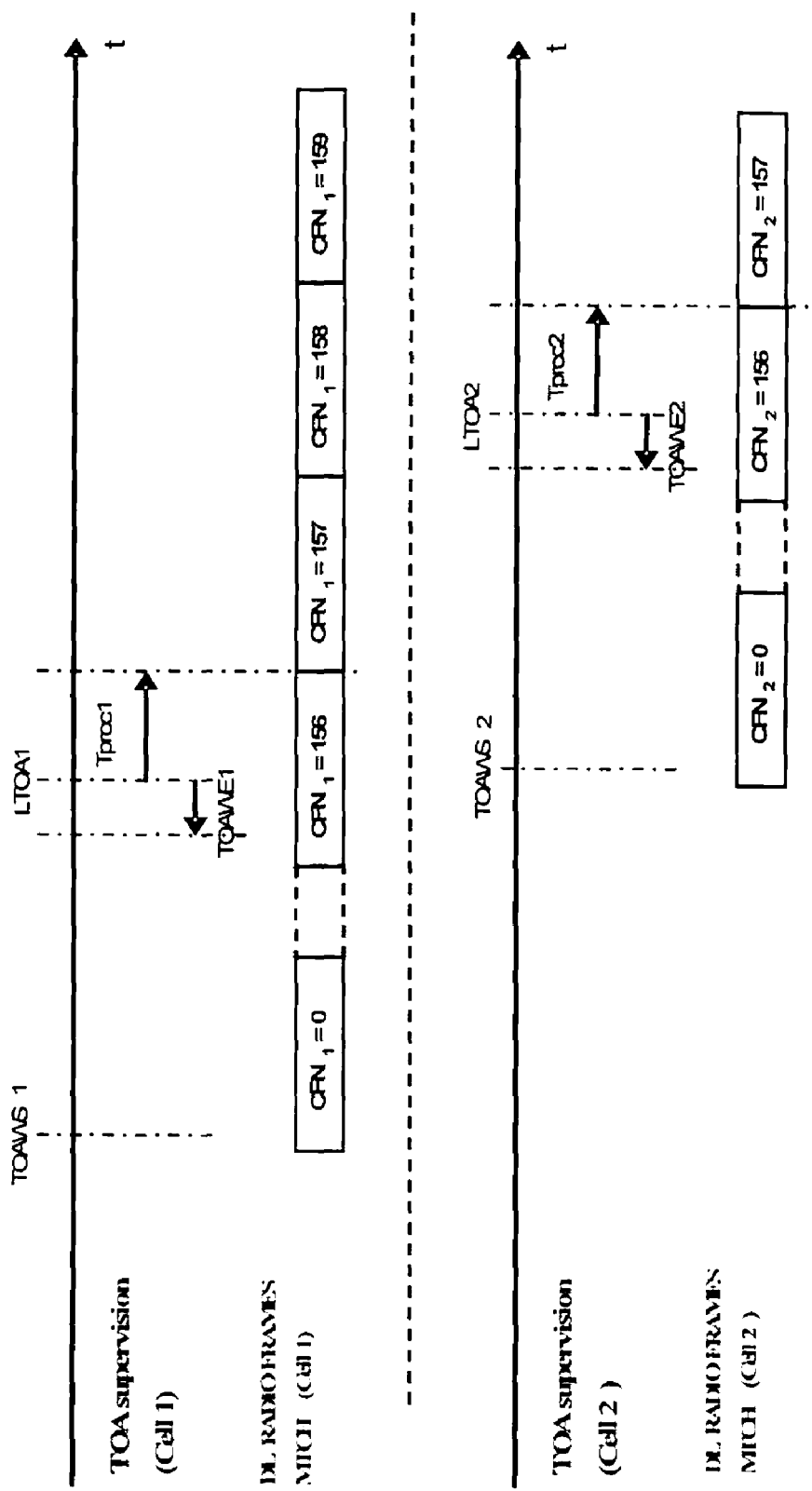
FIG. 8B illustrates example time-or-arrival windows for two common transport channels using a same common transport bearer.

Stability is explained with reference to FIGS. 8A and 8B as follows. When a frame of MBMS data arrives to a radio base station over a transport bearer, the data frame is processed before being retransmitted over a mapped transport channel. The retransmission over the mapped transport channel can be timed to occur on frame boundaries so that reliable signals are received by the UEs in the cell. The radio base station buffers the MBMS data so that the data can be processed before being retransmitted. If the MBMS data arrives relatively long before being retransmitted, the buffering requirements increase. If the MBMS data arrives relatively short before being retransmitted, then the radio base station may not have enough time to process the received data before the retransmission takes place. Thus for each transport channel, a time-of-arrival window may be defined that takes into consideration the buffering and processing capability of the radio base station for the cell so that the retransmission is reliable.

If, during operation, the radio base station receives an MBMS data frame that arrives either too early or too late (outside of the time-of-arrival window) for a transport channel, then the radio base station can send a timing adjustment control frame to the radio network controller. The radio network controller can then accordingly adjust the transmission timing so that the radio base station can receive the MBMS data frame within the preferred time-of-arrival window of the transport channel.

However, in the case where multiple transport channels share a same transport bearer, it should be remembered that there is only one Iub CCH data stream (the transport bearer) carrying the MBMS data from the radio network controller to the radio base station. Hence, a timing adjustment initiated by any one common transport channel will impact the time of arrival for all other common transport channels.

If the time-of-arrival windows are different for at least two channels—e.g., first and second channels (see FIG. 8B which illustrates time-of-arrival windows for two common transport channels using the same transport bearer)—then there is a possibility that the arrival time of the MBMS data frame is outside the first window but is within the second window. A timing adjustment of the same transport bearer triggered for the first window may cause the data frame to arrive outside the second window after the adjustment which would then trigger an opposing timing adjustment for the second window. This in turn would again trigger the timing adjustment for the first window and the process may repeat which makes the situation unstable. Stability is then defined such that a timing adjustment for one transport channel does not cause an opposing timing adjustment for another transport channel sharing a same transport bearer.

Figure 5:
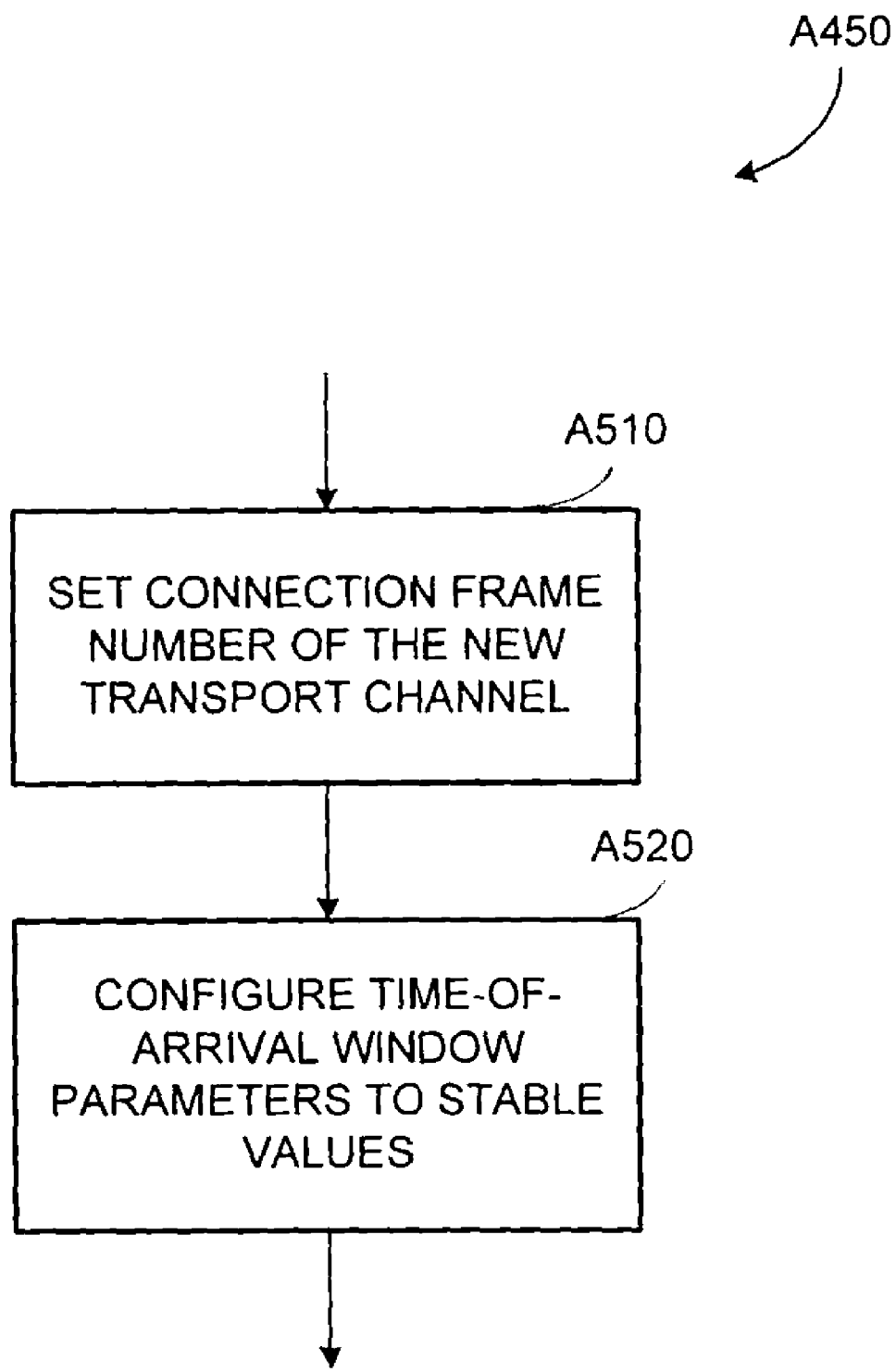
FIGS. 5 and 6 illustrate example modes of operation to configure time-of-arrival window parameters of a new transport channel.

One way to achieve stability is explained with reference to FIG. 5 which illustrates an example mode to carry out act A450. In this mode, the connection frame number (CFN) of the new transport channel is set in act A510. The CFN any transport channel that is to use the common transport bearer can be based on an offset calculation as follows:

$$CFN(new) = \{INT[BFN + Offset(new)] + 1\} \bmod cfnmod;$$

$$BFN = CFN(common) - Offset(common);$$

$$Offset(common) = T\_Proc(common) + TOAWE(common) - T\_Cell(common) - S\text{-}CCPCH\_Offset(common) - S\text{-}CCPCH\_Frame\_Offset(common);$$

$$Offset(new) = T\_Proc(new) + TOAWE(new) - T\_Cell(new) - S\text{-}CCPCH\_Offset(new) - S\text{-}CCPCH\_Frame\_Offset(new),$$

where

BFN is a frame number of the radio base station 250,

CFN(new) is the CFN for the new transport channel in consideration of using the common transport bearer 245, CFN(common) is the CFN for the common transport channel 255 that established the common transport bearer 245 and which is sent in a Iub CCH Frame Protocol header for a common CCH data stream, cfnmod is an integer used in the MOD operation (for example, 256) to filter out range differences between the BFN and the CFN, T_Cell(common) is the timing delay relative to the BFN of the cell (C1, C2, C3) where the common transport channel 255 that established the common transport bearer 245;

T_Cell(new) is the timing delay relative to the BFN of the particular cell for the new transport channel 255, S-CCPCH_Offset(common) is the secondary common control physical channel (S-CCPCH) Offset of the S-CCPCH of the common transport channel 255 that established the common transport bearer 245, S-CCPCH_Offset(new) is the S-CCPCH Offset of the S-CCPCH of the new transport channel 255 in consideration of using the common transport bearer 245, S-CCPCH_Frame_Offset(common) is the S-CCPCH Frame Offset of the S-CCPCH of the common transport channel 255 that established the common transport bearer 245, S-CCPCH_Frame_Offset(new) is the S-CCPCH Frame Offset of the S-CCPCH of the new transport channel 255 in consideration of using the common transport bearer 245, T_Proc(new) is a processing delay of the radio base station 250 for processing the MBMS data frame for the new transport channel 255 in consideration of using the common transport bearer 245, T_Proc(common) is a processing delay of the radio base station 250 for processing the MBMS data frame for the common transport channel 255 that established the common transport bearer 245, TOAWS(new) and TOAWE (new) are begin and end points, respectively, of the time-of-arrival window of the new transport channel 255, and TOAWS(common) and TOAWE (common) are begin and end points, respectively, of a time-of-arrival window of the common transport channel 255 that established the common transport bearer 245.

In particular in act A520, the time-of-arrival window parameters are set such that the conditions abs(T_Proc(new)–T_Proc(common))<=T_Proc threshold, abs(TOAWS(new)–TOAWS(common))<=TOAWS threshold, and abs(TOAWE(new)–TOAWE(common))<=TOAWE threshold are satisfied where the T_Proc threshold, TOAWS threshold and TOAWE threshold are all predetermined. The threshold values are set to prevent or to minimize instability between the transport channels 255.

Referring back to FIG. 4A, after the radio base station 250 configures the new transport channel 255 in act A450, the radio base station 250 then transmits a transport channel setup response message to the radio network controller 240 in act 460. As illustrated in FIG. 4B, the transport channel setup response message can include information related to the new transport channel 255. In act A470, the radio network controller 240 can configure the time-of-arrival window parameters of the new transport channel 255 in response to the transport channel setup response message.

Figure 6:
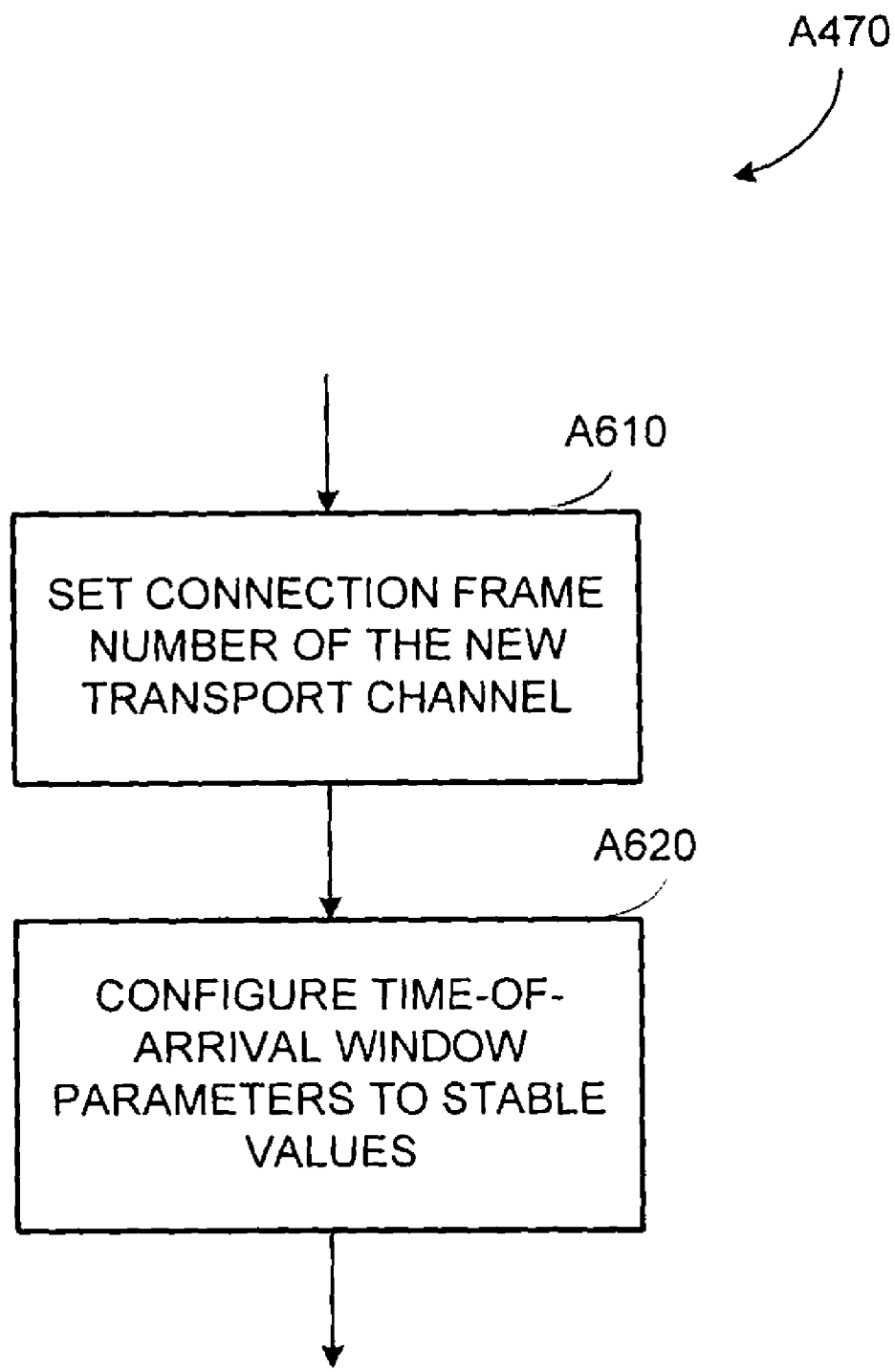

FIG. 6 illustrates an example mode of operation to configure time-of-window parameters of the new transport channel 255 by the radio network controller 240 in act A470. In act A610, the radio network controller 240 can set the time-of-arrival window parameters of the new transport channel 255 to be substantially the same as the common transport channel 255 that first established the common transport bearer 245. If the time-of-arrival windows are substantially the same, this reduces the likelihood that a timing adjustment for one transport channel would cause an opposing adjustment for the other channel.

As an alternative in act A620, the radio network controller 240 can modify the time-of-arrival window parameters for all existing common transport channels 255 that use the common transport bearer 245 and set the time-of-arrival window parameters for the new transport channel 255 in consideration of the existing common transport channels 255 mapped to the common transport bearer 245. The radio network controller 240 can transmit a transport channel reconfiguration message to the radio base station 250 so that the time-of-arrival window parameters of the existing common transport channels 255 by the radio base station 250 to perform act A620. Of course, a combination of acts A610 and A620 may be performed as well.

Acts A410 to A470 illustrated in FIG. 4A are performed to initially establish and configure the common transport channels 255 before actual delivery of the MBMS data from the BM-SC 120 to the UEs 160 commences. In these acts, timing parameters including the time-of-arrive window parameters for the common transport channels 255 are set.

Figure 7:
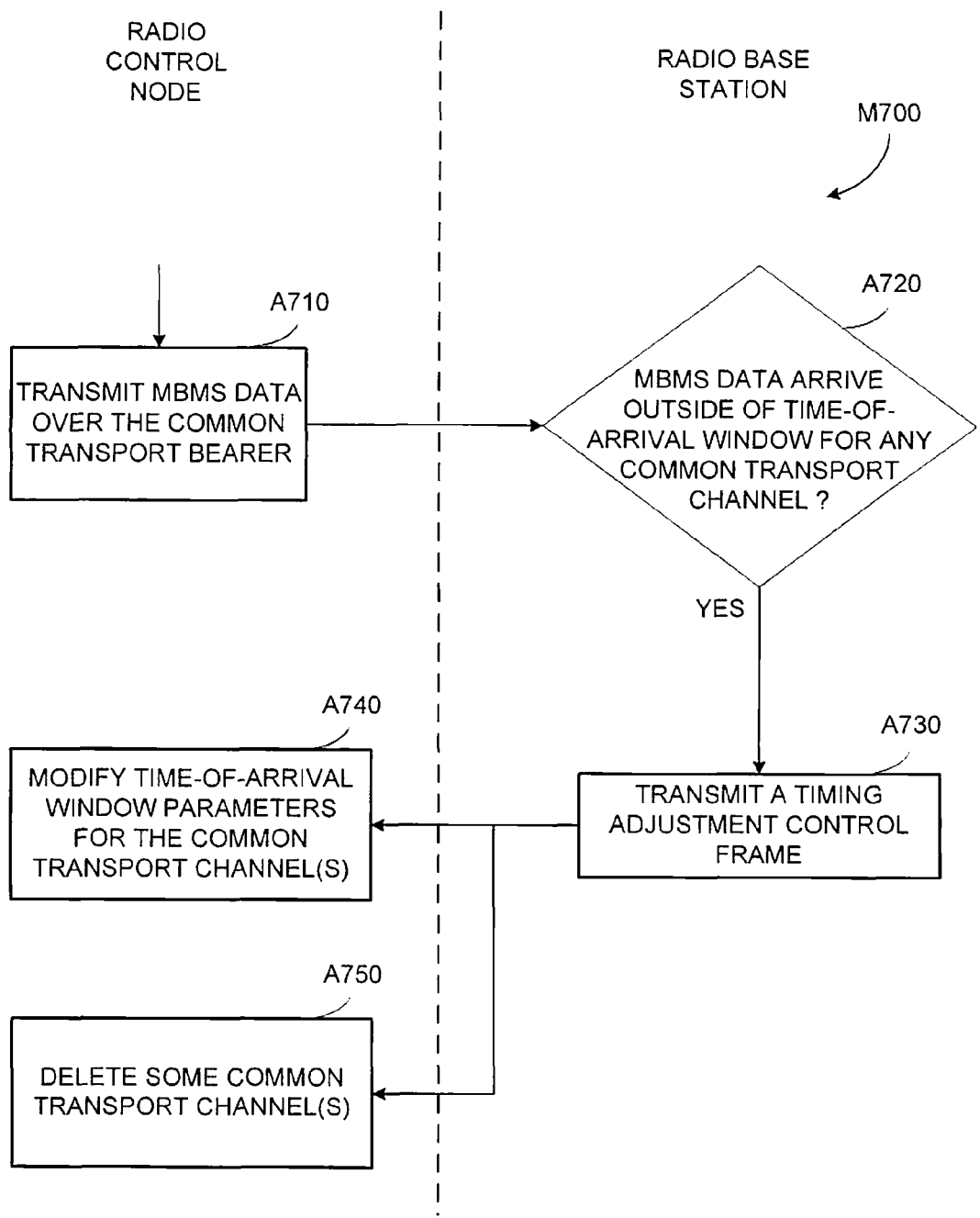
FIG. 7 illustrates example modes of MBMS data frame transmission and reception and operation when the transmitted MBMS data frame arrive outside the time-of-arrival window.

It should be noted that the parameters may be adjusted as the MBMS data are actually provided to the UEs 160 in the cells C1-C3. A non-limiting example of this operation mode (method M700) is illustrated in FIG. 7. In method M700, the common transport bearer 245 and the common transport channels 255 are used to provide the MBMS data to the UEs 160 in the cells C1-C3 served by the radio base station 250. In act A710, the MBMS data is transmitted over the common transport bearer 245 from the radio network controller 240 to the radio base station 250. In act A720, the radio base station determines whether the MBMS data transmitted by the radio network controller 240 arrives outside of the time-of-arrival window for any of the common transport channels 255 mapped to the common transport bearer 245. If so, then in act A730, the radio base station 250 transmits a timing adjustment control frame to the radio network controller 240.

In response to the timing adjustment control frame, the radio network controller may perform one or both of the following actions. First, in act A740, the radio network controller 240 modifies the time-of-arrival window parameters for one or more of the common transport channels 255 so that MBMS data transmissions over the common transport bearer 245 will not arrive outside of the time-arrival-windows for all common transport channels 255. In an example, the radio network controller 240 may transmit the transport channel reconfiguration request message to the radio base station 250 and allow the radio base station 250 to perform the time-of-arrival window parameters reconfiguration.

As an alternative response to the receipt of the timing adjustment control frame from the radio base station 250, the radio network controller 240, in act A750, deletes some, less than all, of the common transport channels 255 so that MBMS data transmissions over the common transport bearer 245 will not arrive outside of the time-arrival-windows for all remaining common transport channels 255. In an example, the radio network controller 240 may transmit the transport channel delete request message to the radio base station 250 and allow the radio base station 250 to delete the affected common transport channel(s) 255. Of course, a combination of acts A740 and A750 may be performed.

Although various embodiments have been shown and described in detail, the claims are not limited to any particular embodiment or example. None of the above description should be read as implying that any particular element, step, act, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

The invention claimed is:

1. A method of operating a radio access network to facilitate a Multimedia Broadcast/Multicast Service (MBMS) session, the method comprising:
   (a) transmitting a transport channel setup request message to a radio base station arranged to serve plural cells;
   (b) determining a common transport bearer corresponding to the MBMS session;
   (c) determining one or more common transport channels each mapped to the common transport bearer; and
   (d) configuring a new transport channel mapped to the common transport bearer such that the new transport channel is stable relative to each of the one or more common transport channels, wherein
   the transport channel setup request message relates to a particular cell of the plural cells,
   each of the one or more common transport channels correspond to each of one or more cells other than the particular cell,
   a mapping between a transport channel and a transport bearer is defined such that MBMS data of the MBMS session transmitted from the radio network controller over the transport bearer to the radio base station is retransmitted from the radio base station over the mapped transport channel to the corresponding cell, and
   a relative stability between first and second transport channels using a same transport bearer is defined such that a timing adjustment of the same transport bearer triggered for the first transport channel does not trigger an opposing timing adjustment of the same transport bearer for the second transport channel.

2. The method of claim 1, wherein
the transport channel set up request message includes one of an identification of the common transport bearer or an indication that transport bearer sharing for the MBMS session is allowed,
when the transport channel set up request message includes the identification of the common transport bearer, step (b) is performed prior to step (a), and
when the transport channel set up request message includes the indication that the transport bearer sharing is allowed, step (b) is performed after step (a).

3. The method of claim 1, wherein
the radio access network is an instance of a Universal Mobile Telecommunications (UMTS) Terrestrial Radio Access Network (UTRAN),
the transport channel setup request message is an instance of a COMMON TRANSPORT CHANNEL SETUP REQUEST MESSAGE of the UTRAN, and
the new transport channel and the common transport channels are all instances of MBMS point-to-multipoint Traffic Channels (MTCH) of the UTRAN.

4. The method of claim 1, wherein act (d) comprises:
(da) configuring a time-of-arrival window for the new transport channel (255) such that relative to each common transport channel, the following conditions are satisfied:

$$abs(T\_Proc(new)-T\_Proc(common))<=T\_Proc\ threshold,$$

$$abs(TOAWS(new)-TOAWS(common))<=TOAWS\ threshold,\ and$$

$$abs(TOAWE(new)-TOAWE(common))<=TOAWE\ threshold,$$

wherein
T_Proc(new) is a radio base station processing delay for processing the MBMS data for the new transport channel in consideration of using the common transport bearer,
T_Proc(common) is a radio base station processing delay for processing the MBMS data for the common transport channel that established the common transport bearer,
TOAWS(new) and TOAWE (new) are begin and end points, respectively, of a time-of-arrival window of the new transport channel, and
TOAWS(common) and TOAWE (common) are begin and end points, respectively, of a time-of-arrival window of the common transport channel that established the common transport bearer.

5. The method of claim 4, wherein step (d) further comprises:
setting a connection frame number (CFN) for the new transport channel (CFN(new)) as follows:

$$CFN(new)=\{INT[BFN+Offset(new)]+1\}\ MOD\ cfnmod;$$

$$BFN=CFN(common)-Offset(common);$$

$$Offset(common)=T\_Proc(common)+TOAWE(common)-T\_Cell(common)-S\text{-}CCPCH\_Offset(common)-S\text{-}CCPCH\_Frame\_Offset(common);$$

$$Offset(new)=T\_Proc(new)+TOAWE(new)-T\_Cell(new)-S\text{-}CCPCH\_Offset(new)-S\text{-}CCPCH\_Frame\_Offset(new),$$

where
cfnmod is an integer,
which BFN is a frame number of the radio base station,
CFN(new) is the CFN for the new transport channel in consideration of using the common transport bearer,
CFN(common) is the CFN for the common transport channel that established the common transport bearer and which is sent in a Iub CCH Frame Protocol header for a common CCH data stream,
T_Cell(common) is the timing delay relative to the BFN of the cell where the common transport channel that established the common transport bearer;
T_Cell(new) is the timing delay relative to the BFN of the particular cell for the new transport channel,
S-CCPCH_Offset(common) is the S-CCPCH Offset of the S-CCPCH of the common transport channel (255) that established the common transport bearer (245),
S-CCPCH_Offset(new) is the S-CCPCH Offset of the S-CCPCH of the new transport channel in consideration of using the common transport bearer,
S-CCPCH_Frame_Offset(common) is the S-CCPCH Frame Offset of the S-CCPCH of the common transport channel that established the common transport bearer, and
S-CCPCH_Frame_Offset(new) is the S-CCPCH Frame Offset of the S-CCPCH of the new transport channel in consideration of using the common transport bearer.

6. The method of claim 5, wherein the cfnmod is 256, and the BFN, the Offset(common) and the Offset(new) are calculated in units of 10 ms.

7. The method (M400) of claim 1, further comprising:
(e) transmitting a transport channel setup response message to the radio network controller, wherein the transport channel setup response message includes information related to the new transport channel; and
(f) configuring time-of-arrival window parameters of the new transport channel in response to the transport channel setup response message transmitted in step (e).

8. The method of claim 7, wherein step (f) comprises:
(fa) setting the time-of-arrival window parameters of the new transport channel to be substantially the same as the common transport channel that established the common transport bearer, or
(fb) modifying the time-of-arrival window parameters for all existing common transport channels that use the common transport bearer and setting the time-of-arrival window parameters for the new transport channel in consideration of the existing common transport channels mapped to the common transport bearer, or
both steps (fa) and (fb).

9. The method of claim 8, wherein step (fb) comprises modifying the time-of-arrival window parameters for all existing common transport channels by transmitting a transport channel reconfiguration request message to the radio base station.

10. The method of claim 1, further comprising:
(g) transmitting MBMS data over the common transport bearer from the radio network controller to the radio base station;
(h) determining whether the MBMS data transmitted over the common transport bearer in act (g) arrives outside of the time-of-arrival window for any of the common transport channels; and
(i) transmitting a timing adjustment control frame from the radio base station to the radio network controller when it is determined that the MBMS data arrives outside of the time-of-arrival window for at least one common transport channel in step (h).

11. The method of claim 10, further comprising:
(j) modifying the time-of-arrival window parameters for the common transport channels so that MBMS data transmissions over the common transport bearer will not arrive outside of the time-arrival-windows for all common transport channels in response to the timing adjustment control frame being transmitted in step (i).

12. The method of claim 10, further comprising:
(k) deleting some, less than all, of the common transport channels so that MBMS data transmissions over the common transport bearer will not arrive outside of the time-arrival-windows for all remaining common transport channels in response to the timing adjustment control frame being transmitted in step (i).

13. A radio access network to facilitate a Multimedia Broadcast/Multicast Service (MBMS) session, comprising:
a radio network controller; and
a radio base station serving plural cells and operatively connected to the radio network controller, wherein
the radio network controller is:
    arranged to transmit a transport channel setup request message for the MBMS session to the radio base station, the transport channel setup request message relating to a particular cell of the plural cells, and
    arranged to transmit MBMS data of the MBMS session over a common transport bearer corresponding to the MBMS session to the radio base station,
the radio base station is:
    arranged to determine one or more common transport channels each mapped to a common transport bearer, each of the one or more common transport channels corresponding to each of one or more cells other than the particular cell,
    arranged to configure a new transport channel mapped to the common transport bearer such that the new transport channel is stable relative to each of the one or more common transport channels, and
    arranged to retransmit the MBMS data received over the common transport bearer to each of the mapped common transport channels,
a mapping between a transport channel and a transport bearer is defined such that the MBMS data transmitted from the radio network controller over the transport bearer to the radio base station is retransmitted from the radio base station over the mapped transport channel to the corresponding cell, and
a relative stability between first and second transport channels using a same transport bearer is defined such that a timing adjustment of the same transport bearer triggered for the first transport channel does not trigger an opposite timing adjustment of the same transport bearer for the second transport channel.

14. The network of claim 13, wherein
a setup request information element in the transport channel setup request message, the setup request information element being one of an identification of the common transport bearer or an indication that transport bearer sharing for the MBMS session is allowed,
when the setup request information element is the identification of the common transport bearer, the radio access controller is arranged to determine the identification of the common transport bearer prior to transmitting the transport channel setup request message, and
when the setup request information element is the indication that the transport bearer sharing is allowed, the radio base station is arranged to determine the identification of the common transport bearer after receiving the transport channel setup request message.

15. The network of claim 13, wherein
the radio access network is an instance of a Universal Mobile Telecommunications (UMTS) Terrestrial Radio Access network (UTRAN),
the transport channel setup request message is an instance of a COMMON TRANSPORT CHANNEL SETUP REQUEST MESSAGE of the UTRAN, and
the new transport channel and the common transport channels are all instances of MBMS point-to-multipoint Traffic Channels (MTCH) of the UTRAN.

16. The network of claim 13, wherein the radio base station is arranged to configure the new transport channel by:
configuring a time-of-arrival window for the new transport channel such that relative to each common transport channel, the following conditions are satisfied:

$$abs(T\_Proc(new)-T\_Proc(common))<=T\_Proc\ threshold,$$

$$abs(TOAWS(new)-TOAWS(common))<=TOAWS\ threshold, and$$

$$abs(TOAWE(new)-TOAWE(common))<=TOAWE\ threshold,$$

wherein
T_Proc(new) is a radio base station processing delay for processing the MBMS data for the new transport channel in consideration of using the common transport bearer,
T_Proc(common) is a radio base station processing delay for processing the MBMS data for the common transport channel that established the common transport bearer,
TOAWS(new) and TOAWE (new) are begin and end points, respectively, of a time-of-arrival window of the new transport channel , and
TOAWS(common) and TOAWE (common) are begin and end points, respectively, of a time-of-arrival window of the common transport channel that established the common transport bearer.

17. The network of claim 16, wherein the radio base station is arranged to set a connection frame number (CFN) for the new transport channel (CFN(new)) as follows:

$$CFN(new)=\{INT[BFN+Offset(new)]+1\}\ MOD\ cfnmod;$$

$$BFN=CFN(common)-Offset(common);$$

$$Offset(common)=Tproc(common)+TOAWE(common)-T\_Cell(common)-S\text{-}CCPCH\_Offset(common)-S\text{-}CCPCH\_Frame\_Offset(common);$$

$$Offset(new)=Tproc(new)+TOAWE(new)-T\_Cell(new)-S\text{-}CCPCH\_Offset(new)-S\text{-}CCPCH\_Frame\_Offset(new),$$

where
cfnmod is an integer,
BFN is a frame number of the radio base station,
CFN(new) is the CFN for the new transport channel in consideration of using the common transport bearer,
CFN(common) is the CFN for the common transport channel that established the common transport bearer and which is sent in a Iub CCH Frame Protocol header for a common CCH data stream,
T_Cell(common) is the timing delay relative to the BFN of the cell where the common transport channel that established the common transport bearer;

T_Cell(new) is the timing delay relative to the BFN of the particular cell for the new transport channel, S-CCPCH_Offset(common) is the S-CCPCH Offset of the S-CCPCH of the common transport channel that established the common transport bearer, S-CCPCH_Offset(new) is the S-CCPCH Offset of the S-CCPCH of the new transport channel in consideration of using the common transport bearer, S-CCPCH_Frame_Offset(common) is the S-CCPCH Frame Offset of the S-CCPCH of the common transport channel that established the common transport bearer, and S-CCPCH_Frame_Offset(new) is the S-CCPCH Frame Offset of the S-CCPCH of the new transport channel in consideration of using the common transport bearer.

18. The network of claim 17, wherein
the cfnmod is 256, and
the BFN, the Offset(common) and the Offset(new) are calculated in units of 10 ms.

19. The network of claim 13, wherein
the radio base station is arranged to transmit a transport channel setup response message to the radio network controller, the transport channel setup response message including information related to the new transport channel, and in response to the transport channel setup response message transmitted by the radio base station, the radio network controller is:

arranged to set the time-of-arrival window parameters of the new transport channel to be substantially the same as the common transport channel that established the common transport bearer, or arranged to modify the time-of-arrival window parameters for all existing common transport channels that use the common transport bearer and setting the time-of-arrival window parameters for the new transport channel in consideration of the existing common transport channels mapped to the common transport bearer, or both.

20. The network of claim 13, wherein
the radio base station is:
arranged to determine whether the MBMS data transmitted over the common transport bearer by the radio network controller arrives outside of the time-of-arrival window for any of the common transport channels, and arranged to transmit a timing adjustment control frame to the radio network controller when it is determined that the MBMS data arrives outside of the time-of-arrival window for at least one common transport channel, and in response to the timing adjustment control frame from the radio base station, the radio network controller is:

arranged to modify the time-of-arrival window parameters for the common transport channels so that MBMS data transmissions over the common transport bearer will not arrive outside of the time-arrival-windows for all common transport channels, or arranged to delete some, less than all, of the common transport channels so that MBMS data transmissions over the common transport bearer will not arrive outside of the time-arrival-windows for all remaining common transport channels.

21. A method of operating a radio base station to facilitate a Multimedia Broadcast/Multicast Service (MBMS) session, wherein the radio base station is arranged to serve plural cells, the method comprising:

(a) receiving a transport channel setup request message for a Multimedia Broadcast/Multicast Service (MBMS) session transmitted from a radio network controller;

(b) determining one or more common transport channels each mapped to a common transport bearer that corresponds to the MBMS session; and (c) configuring a new transport channel mapped to the common transport bearer such that the new transport channel is stable relative to each of the one or more common transport channels, wherein the transport channel setup request message relates to a particular cell of the plural cells, each of the one or more common transport channels corresponds to each of one or more cells other than the particular cell, a mapping between a transport channel and a transport bearer is defined such that MBMS data of the MBMS session transmitted from the radio network controller over the transport bearer to the radio base station is retransmitted from the radio base station over the mapped transport channel to the corresponding cell, and a relative stability between first and second transport channels using a same transport bearer is defined such that a timing adjustment of the same transport bearer triggered for the first transport channel does not trigger an opposite timing adjustment of the same transport bearer for the second transport channel.

22. The method of claim 21, wherein the transport channel setup request includes an indication that transport bearer sharing for the MBMS session is allowed, the method further comprising:

(d) determining a common transport bearer corresponding to the MBMS session, wherein step (d) is performed after step (a).

23. The method of claim 21, wherein step (c) comprises:
(ca) configuring a time-of-arrival window for the new transport channel such that relative to each common transport channel, the following conditions are satisfied:

$$abs(T\_Proc(new)-T\_Proc(common))<=T\_Proc\ threshold,$$

$$abs(TOAWS(new)-TOAWS(common))<=TOAWS\ threshold,\ and$$

$$abs(TOAWE(new)-TOAWE(common))<=TOAWE\ threshold,$$

wherein

T_Proc(new) is a radio base station processing delay for processing the MBMS data for the new transport channel in consideration of using the common transport bearer, T_Proc(common) is a radio base station processing delay for processing the MBMS data for the common transport channel that established the common transport bearer, TOAWS(new) and TOAWE (new) are begin and end points, respectively, of a time-of-arrival window of the new transport channel, and TOAWS(common) and TOAWE (common) are begin and end points, respectively, of a time-of-arrival window of the common transport channel that established the common transport bearer.

24. The method of claim 23, wherein step (c) further comprises:

(cb) setting a connection frame number (CFN) for the new transport channel (CFN(new)) as follows:

$$CFN(new) = \{INT[BFN+Offset(new)]+1\} \text{ MOD } cfnmod;$$

$$BFN = CFN(common) - Offset(common);$$

$$Offset(common) = Tproc(common) + TOAWE(common) - T\_Cell(common) - S\text{-}CCPCH\_Offset(common) - S\text{-}CCPCH\_Frame\_Offset(common);$$

$$Offset(new) = Tproc(new) + TOAWE(new) - T\_Cell(new) - S\text{-}CCPCH\_Offset(new) - S\text{-}CCPCH\_Frame\_Offset(new),$$

where
cfnmod is an integer,
which BFN is a frame number of the radio base station,
CFN(new) is the CFN for the new transport channel in consideration of using the common transport bearer,
CFN(common) is the CFN for the common transport channel that established the common transport bearer and which is sent in a Iub CCH Frame Protocol header for a common CCH data stream,
T_Cell(common) is the timing delay relative to the BFN of the cell where the common transport channel that established the common transport bearer;
T_Cell(new) is the timing delay relative to the BFN of the particular cell for the new transport channel,
S-CCPCH_Offset(common) is the S-CCPCH Offset of the S-CCPCH of the common transport channel that established the common transport bearer,
S-CCPCH_Offset(new) is the S-CCPCH Offset of the S-CCPCH of the new transport channel in consideration of using the common transport bearer,
S-CCPCH_Frame_Offset(common) is the S-CCPCH Frame Offset of the S-CCPCH of the common transport channel that established the common transport bearer, and
S-CCPCH_Frame_Offset(new) is the S-CCPCH Frame Offset of the S-CCPCH of the new transport channel in consideration of using the common transport bearer.

25. The method of claim 24, wherein
the cfnmod is 256, and
the BFN, the Offset(common) and the Offset(new) are calculated in units of 10 ms.

26. A radio base station configured to perform the method of claim 21.

* * * * *

UNITED STATES PATENT AND TRADEMARK OFFICE
CERTIFICATE OF CORRECTION

PATENT NO. : 8,170,569 B2
APPLICATION NO. : 12/594298
DATED : May 1, 2012
INVENTOR(S) : Kuningas et al.

It is certified that error appears in the above-identified patent and that said Letters Patent is hereby corrected as shown below:

In Column 15, Line 26, in Claim 4, after "channel" delete "(255)".

In Column 16, Line 15, in Claim 5, after "channel" delete "(255)".

In Column 16, Line 16, in Claim 5, after "bearer" delete "(245)".

In Column 16, Line 30, in Claim 7, after "method" delete "(M400)".

Signed and Sealed this
Second Day of October, 2012

David J. Kappos
*Director of the United States Patent and Trademark Office*